Dec. 9, 1952 A. WRIGHT 2,621,247
STEREOSCOPIC TELEVISION
Filed Jan. 21, 1950 2 SHEETS—SHEET 1
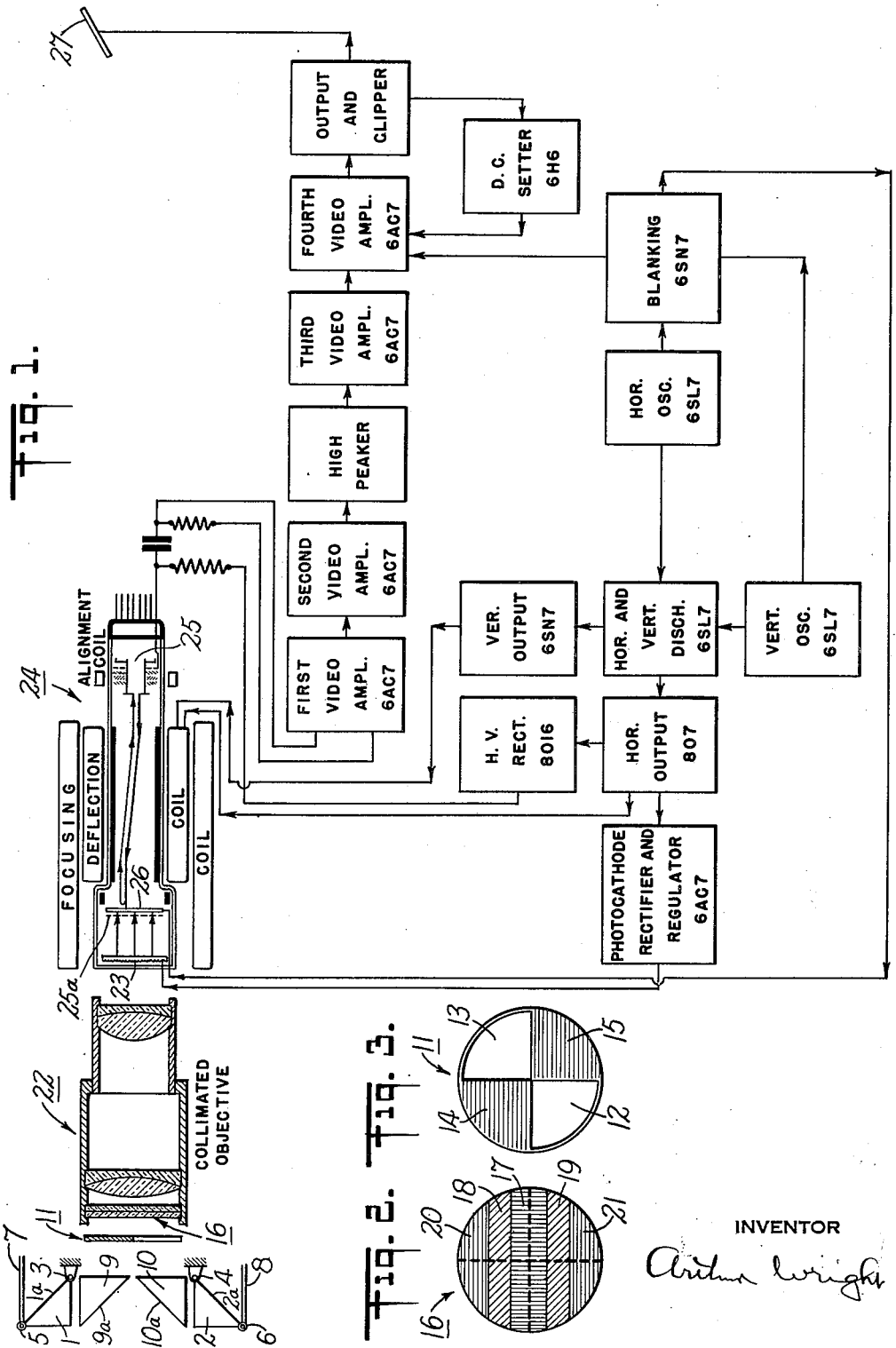
INVENTOR
Arthur Wright Dec. 9, 1952   A. WRIGHT   2,621,247
STEREOSCOPIC TELEVISION
Filed Jan. 21, 1950   2 SHEETS—SHEET 2
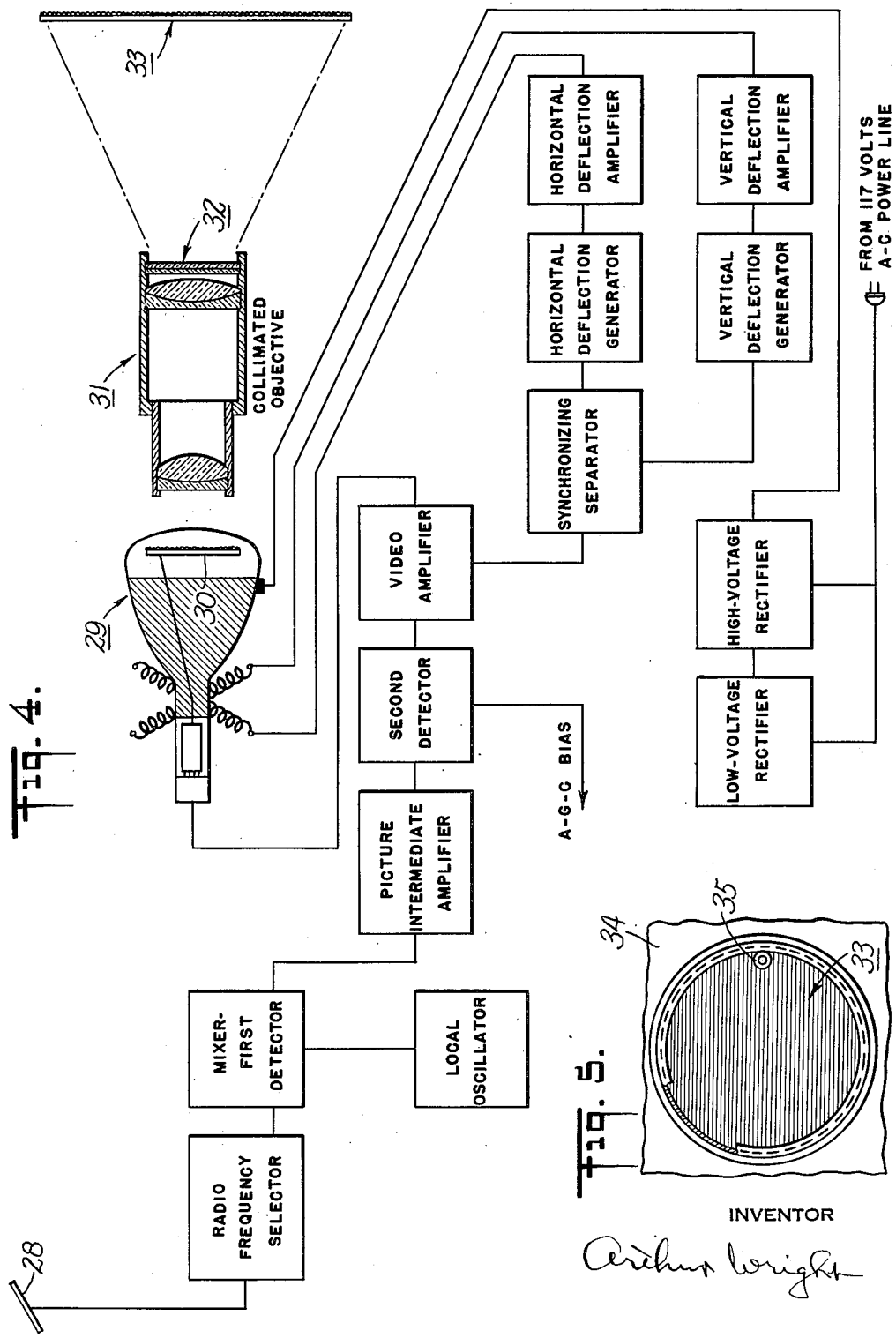
INVENTOR
Arthur Wright Patented Dec. 9, 1952

2,621,247

UNITED STATES PATENT OFFICE 2,621,247

STEREOSCOPIC TELEVISION

Arthur Wright, Forest Hills, N. Y.

Application January 21, 1950, Serial No. 139,858

14 Claims. (Cl. 178—6.5)

My invention relates particularly to television, but it also relates to pictures which may be seen stereoscopically or in colors or both, as well as the apparatus and method relating thereto.

An object of my invention is to provide an apparatus and method for televising advantageously and effectively and which may be, if desired, accomplished stereoscopically and in colors. Other apparatus for color television has been cumbersome, expensive and generally inadequate in operation and these are among the disadvantages designed to be overcome herewith. Other objects of my invention will be seen from the following description thereof hereinafter.

While my invention is capable of embodiment in many different forms, for the purpose of illustration I have described only certain embodiments thereof hereinafter and have shown only one example thereof, by way of illustration in the accompanying drawings, in which—

Fig. 1 is a diagrammatic plan view of a sending apparatus for broadcasting pictures, etc., in colors stereoscopically;

Fig. 2 is an elevation of a color filter which may be used therewith;

Fig. 3 is an elevation of a diaphragm which may be used in connection with Figs. 1 and 2;

Fig. 4 is a diagrammatic side elevation of a receiving apparatus for use with a sending apparatus as in Fig. 1; and Fig. 5 is an elevation of an adjustable rotatable, picot of cylinder-goffered or lined, viewing screen for use therewith.

Referring to the drawings, in carrying out my invention, for example the light from the scene or other subject to be televised is received by right and left prisms 1 and 2 which may be rotatably adjustable on vertical axes 3 and 4, respectively, with the aid of pivots 5 and 6 having manually operable links 7 and 8 pivoted thereto, as in the patent to Herz, No. 1,851,705, granted March 29, 1932. These stereoscopic or binocular prisms 1 and 2 transmit the light of the stereoscopic pair of images, composed of a left eye image and a right eye image, by mirrors 1a and 2a through prisms 9 and 10 having mirror faces 9a and 10a, from which the light of the stereoscopic pair of images passes through a diaphragm 11 having diagonally opposed segmental openings 12 and 13, so that the opening 12 transmits the left eye image and the opening 13 transmits the right eye image, with intervening opaque segmental areas 14 and 15. In this way the light from the prism 1 passes through the diaphragm opening 12 and the light from the prism 2 passes through the diaphragm opening 13. The light from the respective openings 12 and 13 is received by a 5-banded filter 16 having a wide central narrow band 17 of red, two bands 18 and 19 of green above and below the same, and two narrow bands 20 and 21 of blue above and below said green bands, chosen so that the light from the opening 12 formed from the bands 17, 19 and 21, and likewise the light from the opening 13 formed from the bands 17, 18 and 20, produces white light, preferably, although other different color bands and of two or more zones may be used, if desired. However, the colors combined facing the openings 12 and the colors combined facing the opening 13 will, respectively, make the same color or colors and preferably white light. Thence the light passes through a collimated objective constructed, preferably, as set forth in the patent to Kitroser No. 1,941,696, granted January 2, 1934, or the patent to Oswald, No. 1,825,122, granted September 29, 1931, so as to be focussed thereby onto a goffered face of a photo cathode plate of glass or any other suitable material, having cylindrical or picot lenticulations, each of which may be of any desired width or diameter but which, preferably, have a breadth such as to be from 5 to 30 per millimeter and the outer faces of which will be horizontal or inclined cylindrical lenticulations or spherical lenticulations, with a radius, whether cylindrical or spherical, of about ⅓ the thickness of the plate 23 so as to focus the light of each lenticule received from the different color zones 16 and the separate binocular areas 12 and 13 onto the right face of the plate 23 carrying, sputtered directly thereon or on a separate mica plate, a multitude of separate insulated particles of silver-caesium photo-electric material, as in the usual construction of photo cathodes.

This photo cathode plate 23 is located in the usual way within a camera tube such as an orthicon, which may be the tube known as orthicon or the tube known as image orthicon, 24, having the well known construction thereof except for the presence of the gofferings or lenticulations above referred to associated with the photo cathode, as for instance the image orthicon in Grob, 1949, Basic Television, McGraw-Hill Book Company Inc., N. Y., and especially pages 28–33, 513 thereof, or in Terman, Radio Engineering, 1947, McGraw-Hill Book Company Inc., N. Y., and especially pages 832–834 thereof, or the orthicon in Fink, Principles of Television Engineering, 1940, McGraw-Hill Book Company Inc., N. Y. and especially pages 111-116, or in Terman (ibid) and especially pages 826-830 thereof. The circuit arrangement may be of any desired kind or as shown on page 513 of Grob (ibid) or Fink (ibid) or Terman (ibid) so as to broadcast the successive signals of the picture elements through the agency of the straight line cathode ray scanning beam from an electron gun 25 having a five stage electron multiplier section, which is received perpendicularly through an extremely fine and uniform open mesh wire screen 25a to collect secondary electrons located very near to a two-sided target plate 26, on both sides of which the charge pattern appears, of the usual construction and which may be of low-resistivity glass, retaining the electron image of the subject to be televised by means of the electrons projected from the photo cathode 23. In view of the fact that the picture resolution is very effective in the orthicon and that the image orthicon is from 10 to 20 times as sensitive as other types of camera tubes, the picture area may be readily subdivided by the 5-band filter with the size of the gofferings above referred to, especially as the gofferings on the photo cathode plate need not be small, in view of the relatively small dimensions, that is to say not greatly enlarged size, of the viewing screen hereinafter referred to as compared to the lenticulated plate 23 or as compared to the lenticular plate in the picture tube hereinafter referred to.

The signals thus produced by the scanning in the camera tube are then broadcast by an antenna 27, to be received by an aerial 28 and thence transmitted through any desired circuits, as shown for example in Grob (ibid), and especially page 128 thereof, or Fink (ibid), or Terman (ibid), to a picture tube or kinescope 29. This is of the usual construction except that, instead, a fluorescent material, such as, preferably, cadmium tungstate which makes a white light, is carried by the rear face of a plate of glass or any other suitable material 30, having on the front face thereof gofferings of the same characteristics as on the plate 23 so that the individual gofferings focus on the fluorescent material. The focal points of said gofferings, furthermore, are in the focal point of a collimated objective 31 constructed the same substantially as the objective 22 and which is equipped with a color filter 32, the same as the color filter 16. The said objective will thus focus the subject being televised onto the rear ground-glass face of a viewing screen 33, preferably of glass, or any other suitable material, such as a transparent plastic. The forward face of the viewing screen 33 has thereon means to display to the left and right eyes, respectively, merely the left and right eye images, as for instance gofferings of substantially the same optical characteristics and alignment, but of larger actual dimensions according to the increase in size of the screen 33 as compared to the plate 30. Instead of the gofferings the plate 33 may have on its front face a series of spaced black lines. Thus, owing to the position of the gofferings or lines on the plate 33 in alignment with the gofferings of the plates 23 and 30 and by the tilting of the head slightly laterally so that the left eye sees through the lower part of the lenticles of the plate 33 or beneath the black lines while the right eye sees through the upper part of said lenticles or above the black lines or vice versa, the respective pictures from the prisms 1 and 2 can be seen merely by the two eyes respectively, as in the case of the prisms 1 and 2 in stereoscopic vision. This is evident from the fact that the left and right eye images are arranged in alternating stripes on the viewing screen 33 as in the case of the plates 23 and 30. Also, the screen 33 may be circular and rotatably adjustable in a socket or channel of a cabinet 34 by means of a knob 35, to adjust the said alignment.

In the operation, due to the diaphragm 11 the right eye picture from the prism 1 will be received on the upper sides of the curved lenticles and the left eye picture from the prism 2 will be received on the under side of the curved lenticles on the plate 23, each of said two separate sets of lines being in natural 3-color separation, and thus transmitted to be received on the viewing screen 33 in two sets of separate alternating groups of 3-color lines, the gofferings or spaced black lines of which, especially when the head is tilted slightly to one side, prevent the left eye picture from reaching the right eye and prevent the right eye picture from being seen by the left eye, thus exhibiting the binocular views of the prisms 1 and 2 to the two eyes stereoscopically and in their respective natural colors, which coalesce in the eyes subjectively to produce the normal stereoscopic vision. By having the lenticles or lines of the screen 33 and lenticulated plates 23 and 30 more or less horizontal, the right and left eye picture lines in the entire width of the picture, viewed through the screen 33, will have the same visibility to the respective eyes above and below each of the individual black lines or through the lines of goffering of the screen 33, according to the extent of the lateral tilting of the eyes when viewing the picture. As an aid to the alignment of the view obtained, the rotatably adjustable knob 35 may be operated to move the screen lines 33 into horizontal or a conforming position with regard to the lines of the picture on the fluorescent screen 30, as the two sets of right and left picture lines have a relative vertical displacement due to the diaphragm openings 12 and 13, which, as shown in Fig. 3, are at different levels respectively. Or, especially when spherical picots have been used on the plates 23 and 30, the lines of the screen 33 may be adjusted into a vertical or nearly vertical position, if desired, as the right and left eye pictures have, also, a lateral displacement, as shown in Fig. 3, due to diaphragm openings 12 and 13 being laterally displaced, respectively. Or, instead, the viewing screen 33 may even be adjusted into a diagonal position, conforming to diagonal lenticles used, or to spherical picots, due to the relative displacement of the diaphragm openings 12 and the resultant relative displacement of 13 and the right and left eye picture elements made therefrom.

While I have described my invention above in detail I wish it to be understood that many changes may be made therein without departing from the spirit of the same. For instance, the blue areas of the filters can be made smaller than any of the other color areas, as the blue has a tendency to be transmitted with greater intensity than the other colors. Of course, other fluorescent materials can be used, instead of the fluorescent material referred to in the picture tube 29. Also, it will be understood that any other cathode ray camera tubes and picture tubes may be used instead of the orthicon 24 and the picture tube 29. Furthermore, the zones of the color filters 16 and 32 can be arranged vertically, if desired, with vertical gofferings or picots in the camera and picture tubes. Or, if desired, the cylindrical lenticulations in the camera and picture tubes and the color zones of the color filters 16 and 32 can likewise be arranged at any other angle, for instance at 45° to the horizontal but at right angles to the respective positions, by the corresponding rotary displacement at 45°, of the diaphragm apertures 12 and 13, in which event the rotary viewing screen 33 would be adjusted with its lines or cylindrical gofferings at approximately the same angle, 45°, as the cylindrical lenticulations of the camera and picture tubes.

Also, it will be understood that the pictures may be exhiibted in colors or natural colors without being stereoscopic, if desired, by omitting the prisms 1, 2, 3 and 4, also the diaphragm 11 and the lines or gofferings of the viewing screen 33, in which event the zone filters 16 and 32 would have preferably only two or three color zones made up of any two or more color bands and the gofferings in the cathode ray tubes being arranged vertically or horizontally, as desired. Also, any of the pictures herein transmitted can be in black and white by having the views received, by the camera tube color filter, in black and white or by omitting either or both of the color filters 16 and 32.

I claim:

1. In a stereoscopic television transmitter, an optical objective, a diaphragm having two laterally displaced openings, a television camera tube having associated therewith a light receiving surface provided with lenticles, and a set of binocular prisms to transmit light to the objective through said openings, respectively, onto said lenticles.

2. In a stereoscopic television transmitter, an optical collimated objective, a diaphragm having two laterally displaced openings, a television camera tube having associated therewith a light receiving surface provided with lenticles, and a set of binocular prisms to transmit light to the objective through said openings, respectively, onto said lenticles.

3. In a stereoscopic television transmitter, an optical objective, a diaphragm having two laterally and vertically displaced openings, having a color filter with a plurality of different color zones, a television camera tube having associated therewith a light receiving surface provided with horizontally arranged lenticles, and a set of binocular prisms to transmit light to the objective through said openings, respectively, onto said lenticles.

4. In a stereoscopic televison receiver, a television picture tube with a fluorescent area and a lenticular goffered surface associated therewith located at the picture tube, a projection objective, a color filter having a plurality of different color zones, and a viewing screen having linear light transmitting areas extending across the color zones.

5. In a stereoscopic television receiver, a television picture tube with a fluorescent area and a lenticular goffered surface associated therewith located at the picture tube, an objective lens, and a viewing screen, having a series of light obstructing elements, to receive the light from the fluorescent area and display to the right and left eyes only the right and left eye images, respectively.

6. In a stereoscopic television receiver, a television picture tube with a fluorescent area and a lenticular goffered surface associated therewith located at the picture tube, an objective provided with a zoned color filter, and a viewing screen, having a series of lenticular light obstructing elements, to receive the light from the fluorescent area and display to the right and left eyes only the right and left eye images, respectively.

7. In a stereoscopic television receiver, a television picture tube with a fluorescent area and a lenticular goffered surface associated therewith, an objective provided with a zoned color filter, and a viewing screen to receive the light from the fluorescent area, having linear areas beyond the fluorescent area to transmit the light and display to the right and left eyes only the right and left eye images, respectively.

8. In a stereoscopic television receiver, a television picture tube with a fluorescent area and a lenticular goffered surface associated therewith located at the picture tube, an objective provided with a zoned color filter, and a viewing screen to receive the light from the fluorescent area, having linear areas, in the form of black lines, beyond the fluorescent area to transmit the light and display to the right and left eyes only the right and left eye images, respectively.

9. In a stereoscopic television receiver, a television picture tube with a fluorescent area and a lenticular goffered surface associated therewith located at the picture tube, an objective provided with a zoned color filter, and a viewing screen to receive the light from the fluorescent area, having linear dark areas beyond the fluorescent area to transmit the light, hiding the right and left eye picture from the left and right eyes respectively.

10. In a stereoscopic television receiver, a television picture tube with a fluorescent area and a lenticular goffered surface associated therewith located at the picture tube, and objective provided with a zoned color filter, and a viewing screen to receive the light from the fluorescent area, having linear lenticular areas beyond the fluorescent area to transmit the light, hiding the right and left eye pictures from the left and right eyes respectively.

11. A stereoscopic television system, comprising a stereoscopic binocular prismatic optical image-producing means including a diaphragm with right and left eye image transmitting openings, an optical objective, a cathode ray camera tube having a photocathode with a goffered surface to receive the right and left eye images respectively from the objective, a cathode ray picture tube in receiving relation to said camera tube having a fluorescent area to receive an electron ray scanning beam and having a goffered surface associated with said fluorescent area, a viewing objective to receive the images from the fluorescent area provided with the goffered surface, and a viewing screen having elements to obstruct the view of the left and right eye images by the right eye and left eye respectively.

12. A stereoscopic television system, comprising a stereoscopic binocular prismatic optical image-producing means including a diaphragm with right and left eye image transmitting openings, a zoned color filter exhibiting a similar range of color zones to each of the said diaphragm openings, an optical objective, a cathode ray camera tube having a photocathode with a goffered surface, provided with lenticulations parallel to said color zones, to receive the right and left eye images respectively from the objective, a cathode ray picture tube in receiving relation to said camera tube, having a fluorescent area to receive an electron ray scanning beam and having a goffered surface, provided with lenticulations parallel to said color zones, associated with said fluorescent area, a viewing objective to receive the images from the fluorescent area provided with the goffered surface, and a viewing screen having elements to obstruct the view of the left and right eye images by the right eye and left eye respectively.

13. A stereoscopic television system, comprising a stereoscopic binocular prismatic optical image-producing means including a diaphragm with right and left eye image transmitting openings, an optical objective, a cathode ray camera tube having a photocathode with a goffered surface to receive the right and left eye images respectively from the objective, a cathode ray picture tube in receiving relation to said camera tube, having a fluorescent area to receive an electron ray scanning beam and having a goffered surface associated with said fluorescent area, a viewing objective to receive the images from the fluorescent area provided with the goffered surface, and a rotatably adjustable viewing screen having elements to obstruct the view of the left and right eye images by the right eye and left eye respectively.

14. A stereoscopic television system, comprising a stereoscopic binocular prismatic optical image-producing means including a diaphragm with right and left eye image transmitting openings, a zoned color filter exhibiting a similar range of color zones to each of the said diaphragm openings, an optical objective, a cathode ray camera tube having a photocathode with a goffered surface, provided with lenticulations parallel to said color zones, to receive the right and left eye images respectively from the objective, a cathode ray picture tube in receiving relation to said camera tube, having a fluorescent area to receive an electron ray scanning beam and having a goffered surface, provided with lenticulations parallel to said color zones, associated with said fluorescent area, a viewing objective to receive the images from the fluorescent area provided with the goffered surface, and a rotatably adjustable viewing screen having elements to obstruct the view of the left and right eye images by the right eye and left eye respectively.

ARTHUR WRIGHT.

REFERENCES CITED

The following references are of record in the file of this patent:

UNITED STATES PATENTS

| Number | Name | Date |
|---|---|---|
| 2,118,160 | Cawley | May 24, 1938 |
| 2,213,547 | Iams | Sept. 3, 1940 |
| 2,214,973 | Rose | Sept. 17, 1940 |
| 2,301,254 | Carnaham | Nov. 10, 1942 |
| 2,349,071 | Baird | May 16, 1944 |
| 2,408,383 | Evans | Oct. 1, 1946 |
| 2,416,720 | Teal | Mar. 4, 1947 |
| 2,452,619 | Weimer | Nov. 2, 1948 |
| 2,479,820 | Devore | Aug. 23, 1949 |
| 2,508,920 | Kell | May 23, 1950 |
| 2,543,793 | Marks | Mar. 6, 1951 |